(12) United States Patent
Hanssen

(10) Patent No.: US 9,645,870 B2
(45) Date of Patent: *May 9, 2017

(54) SYSTEM FOR DEBUGGING DMA SYSTEM DATA TRANSFER

(71) Applicant: Atmel Corporation, San Jose, CA (US)

(72) Inventor: Ingar Hanssen, Tiller (NO)

(73) Assignee: Atmel Corporation, San Jose, CA (US)

( * ) Notice: Subject to any disclaimer, the term of this patent is extended or adjusted under 35 U.S.C. 154(b) by 244 days.

This patent is subject to a terminal disclaimer.

(21) Appl. No.: 13/929,617

(22) Filed: Jun. 27, 2013

(65) Prior Publication Data

US 2015/0006970 A1  Jan. 1, 2015

(51) Int. Cl.
| | | |
|---|---|---|
| *G06F 11/00* | (2006.01) | |
| *G06F 11/07* | (2006.01) | |
| *G06F 11/22* | (2006.01) | |
| *G06F 11/34* | (2006.01) | |
| *G06F 11/30* | (2006.01) | |

(52) U.S. Cl.
CPC ...... *G06F 11/0706* (2013.01); *G06F 11/2221* (2013.01); *G06F 11/3037* (2013.01); *G06F 11/3055* (2013.01); *G06F 11/3485* (2013.01); *G06F 11/3476* (2013.01); *G06F 2201/835* (2013.01)

(58) Field of Classification Search
CPC ............ G06F 11/2221; G06F 11/3027; G06F 11/3034; G06F 11/3037; G06F 11/3041; G06F 11/3466; G06F 11/3471; G06F 11/3476; G06F 11/348; G06F 11/3485; G06F 11/349; G06F 11/3495; G06F 11/3636; G06F 11/364; G06F 13/28; G06F 13/282; G06F 13/285; G06F 13/287

See application file for complete search history.

(56) References Cited

U.S. PATENT DOCUMENTS

| | | | | |
|---|---|---|---|---|
| 5,896,524 | A | * | 4/1999 | Halstead et al. ............. 713/375 |
| 6,018,809 | A | * | 1/2000 | Garrett ........................... 714/37 |
| 6,026,501 | A | | 2/2000 | Hohl et al. |
| 6,047,124 | A | * | 4/2000 | Marsland ...................... 717/128 |
| 6,145,100 | A | | 11/2000 | Madduri |
| 6,345,295 | B1 | * | 2/2002 | Beardsley et al. ............ 709/224 |
| 6,732,307 | B1 | | 5/2004 | Edwards |
| 6,802,031 | B2 | | 10/2004 | Floyd et al. |

(Continued)

OTHER PUBLICATIONS

NN9012465 "Monitoring of Computer Systems Input/Output Bus Functions", Dec. 1, 1990, IBM Technical Disclosure Bulletin, vol. 33, Iss. 7, pp. 465-467.*

(Continued)

*Primary Examiner* — Gabriel Chu
(74) *Attorney, Agent, or Firm* — Fish & Richardson P.C.

(57) ABSTRACT

Systems and methods for generating DMA transaction trace records are described. One example system includes a controller that includes a trace module. The trace module receives transfer requests for direct memory access channels, receives timestamps indicative of a transfer request time, generates trace records, wherein each trace record includes a respective timestamp indicative of a transfer request time, generates save commands, and delivers the trace records and the save commands as outputs. The system includes a storage module for saving trace records.

16 Claims, 4 Drawing Sheets

(56) References Cited

U.S. PATENT DOCUMENTS

| | | |
|---|---|---|
| 6,912,673 B1 | 6/2005 | Wyland |
| 6,920,586 B1 | 7/2005 | Moyer |
| 7,043,668 B1 | 5/2006 | Treue et al. |
| 7,076,767 B1 | 7/2006 | Williams |
| 7,231,339 B1 | 6/2007 | Nemecek et al. |
| 7,330,809 B2 | 2/2008 | Tabe |
| 7,464,301 B1 | 12/2008 | Entezari et al. |
| 7,490,271 B2 | 2/2009 | Higashida et al. |
| 7,712,084 B2 | 5/2010 | Beuten et al. |
| 8,407,528 B2 | 3/2013 | Larson |
| 8,499,201 B1* | 7/2013 | Chiu et al. .......... 714/46 |
| 2002/0026544 A1* | 2/2002 | Miura .............. 710/25 |
| 2002/0188831 A1* | 12/2002 | Jackson et al. ........... 712/227 |
| 2002/0194401 A1* | 12/2002 | Sakugawa ............ 710/28 |
| 2004/0199823 A1* | 10/2004 | Dodson et al. ............ 714/30 |
| 2005/0033553 A1* | 2/2005 | Swaine et al. ............ 702/176 |
| 2005/0193277 A1* | 9/2005 | Horikawa et al. .......... 714/45 |
| 2007/0074081 A1 | 3/2007 | DeWitt et al. |
| 2008/0133838 A1 | 6/2008 | Higuchi et al. |
| 2010/0077143 A1* | 3/2010 | Reid et al. ................ 711/118 |
| 2011/0219376 A1* | 9/2011 | Williams et al. ........... 718/100 |
| 2011/0320745 A1 | 12/2011 | Zhang et al. |
| 2013/0159780 A1* | 6/2013 | Bedwell et al. ............. 714/45 |
| 2013/0254596 A1* | 9/2013 | Eder et al. ................. 714/45 |
| 2015/0006965 A1 | 1/2015 | Hanssen |
| 2015/0006969 A1 | 1/2015 | Hanssen |

OTHER PUBLICATIONS

Non-final rejection for U.S. Appl. No. 13/929,554, mailed Apr. 10, 2015, 8 pages.
Non-final rejection for U.S. Appl. No. 13/929,605, amiled Jun. 18, 2015, 22 pages.
U.S. Appl. No. 13/929,605, filed Jun. 27, 2013, Ingar Hanssen.
U.S. Appl. No. 13/929,554, filed Jun. 27, 2013, Ingar Hanssen.

* cited by examiner

SYSTEM FOR DEBUGGING DMA SYSTEM DATA TRANSFER

TECHNICAL FIELD

This disclosure relates generally to electronics including controllers.

BACKGROUND

Microcontrollers can be used for controlling other devices. Devices that can be controlled by microcontrollers include analog to digital converters, digital to analog converters, input and output ports, direct memory access (DMA) controllers, coprocessors, and memories.

A DMA controller can transfer data between different memories and the devices controlled by a microcontroller, and thus can allow high speed data transfer with little CPU involvement. The DMA controller may move data between memories and devices using a number of independent DMA channels and may allow a number of independent and parallel data transfers.

The DMA controllers can move data between static random access memory (SRAM) and devices, between SRAM locations, and between device registers. With access to all devices, the DMA controller can handle automatic transfer of data to/from communication modules (i.e., ports). The DMA controller can also read from a memory mapped electronic erasable programmable read only memory (EE-PROM).

SUMMARY

In one aspect, a controller system includes a trace module that receives transfer requests for direct memory access channels, receives timestamps indicative of a transfer request time, generates trace records, wherein each trace record includes a respective timestamp indicative of a transfer request time, generates save commands, and delivers the trace records and the save commands as outputs; and a storage module for saving trace records.

In another aspect, a method includes receiving transfer requests for direct memory access channels; receiving timestamps indicative of a time associated with a given request; sampling the received transfer requests; generating trace records, wherein each trace record includes a respective timestamp indicative of a transfer request time; generating save commands in response to the received transfer requests; and saving a trace record in response to a save command in an external device.

Implementations may include one or more of the following features. The trace module may include a latch module that samples the received transfer requests, an assembly module that generates trace records, and a detection module that detects the transfer requests and generates save commands responsive thereto to enable saving of the trace records.

The storage module saves one or more trace records in response to receipt of corresponding save commands, wherein the storage module provides an overflow signal, and the overflow signal sets or clears an overflow bit of a current trace record upon unsuccessful storage of a preceding trace record or upon successful storage of the preceding trace record.

One or more peripheral devices may be coupled to the controller system and the transfer requests may be initiated by the controller or by a peripheral device. The controller system can be a part of an integrated circuit incorporated in a chip. Transfer requests may include a read request from a direct memory access channel, or a write request to a direct memory access channel and a transfer request may be generated for each unit of data transferred from/to direct memory access channels.

The controller system may be coupled to one or more devices for saving and/or viewing the trace records. The devices may include a dedicated timestamp trace buffer, a dedicated physical trace port, an existing trace port, wherein the existing port is configured to be shared, or an onboard direct access memory channel coupled to an onboard static random access memory.

Generating a trace record further includes receiving an overflow signal, the overflow signal indicating success or failure of a preceding save command to save a trace record, and modifying an overflow bit of a current trace record according to the received overflow signal, including setting the overflow bit when a preceding trace record failed to be saved. An overflow bit of a current trace record may be cleared when a preceding trace record is successfully saved.

Aspects of the invention may implement none, one or more of the following advantages. Proposed systems and methods can be used to connect a DMA controller to a storage module so as to enable saving of timestamps indicating corresponding times of the DMA transfer requests.

The details of one or more implementations are set forth in the accompanying drawings and the description below. Other aspects, features, and advantages will be apparent from the description and drawings, and from the claims.

DETAILED DESCRIPTION

Microcontrollers can be used for controlling one or more other devices (as will be referred to hereafter as, peripheral devices). DMA controllers can transfer data between memories and peripheral devices with little involvement of the central processing unit(s) (CPU)(s) of the microcontroller, and may allow high speed data transfers between peripheral devices and memories.

A DMA transaction is defined as a complete DMA read or write between memories or between memories and peripheral devices. Traditionally, DMA transactions are performed in data blocks. Data block sizes may be controlled by software and can be divided into smaller burst transfers that can be characterized as successive single units of data wherein a single unit of data may be defined as a single bus access. A unit of data can vary depending on the architecture of the system, and can be configured to support, for example, sizes of a byte, a half-word, or a word. A burst may be defined as N units of data where N can be an integer such as 1, 2, 4, or 8 in some configurations. DMA transfers start when a DMA transfer request is detected. A transfer request can be triggered from software, from a peripheral device, or in response to an event.

Figure 1:
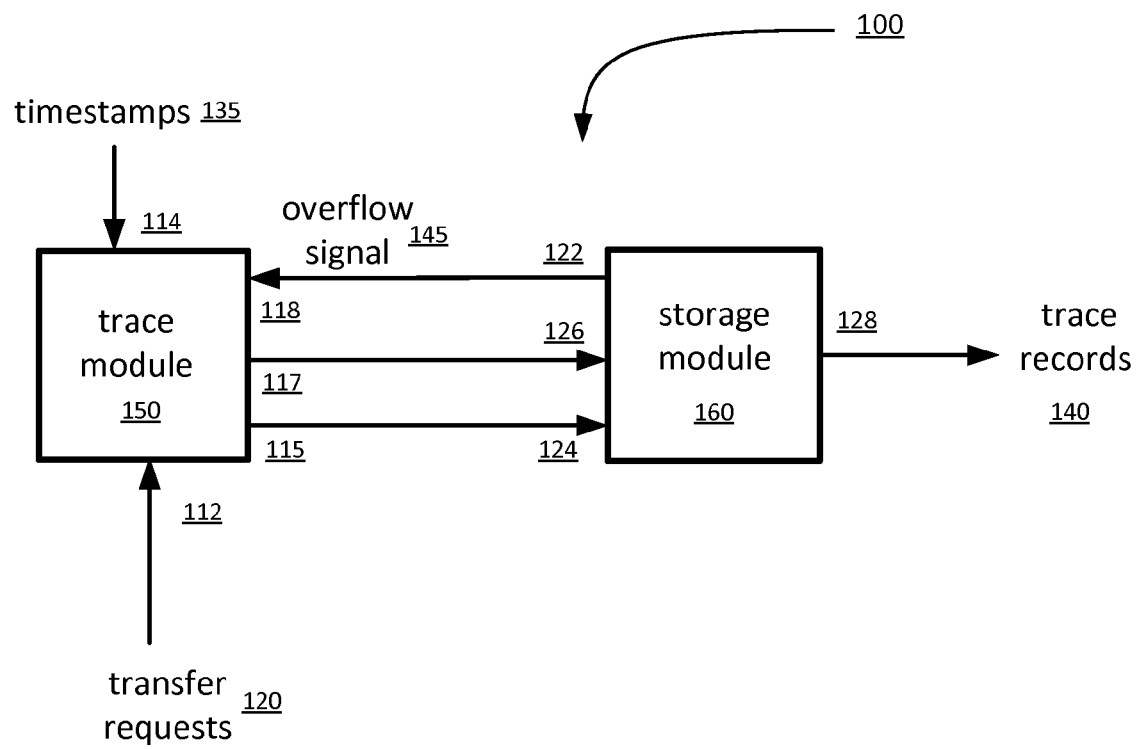
FIG. 1 is a diagram of an example control system.

Referring to FIG. 1, an example of a controller 100 is shown that includes a trace module 150 which receives transfer requests 120 through the input port 112. The trace module 150 also receives, through the input port 114, the system timestamps 135 generated by the controller 100. Based on the transfer requests 120 and the timestamps 135, the trace module 150 generates trace records and save commands. The trace records and save commands are respectively delivered through the output ports 115 and 117 to a storage module 160. The trace module 150 is described below with respect to FIG. 2.

The storage module 160 receives the trace records through the input port 124 and the save commands through the input port 126, respectively. In response to receiving a save command from the input port 126, the storage module 160 saves the corresponding trace record received from the input port 124. The storage module 160 stores one or more trace records and may deliver the saved trace records 140 at the output port 128.

In some implementations, the storage module 160 may be coupled to/replaced with a dedicated trace buffer for saving the trace records. In some implementations, the storage module 160 may be coupled to a dedicated physical trace port or may be coupled to an existing trace port being configured to be shared and enabling saving the trace records. In some implementations, the storage module 160 can be coupled to an onboard direct access memory channel which is coupled to an onboard static random access memory for saving the trace records. In some implementations, the storage module 160 can be coupled to an external buffer using an Ethernet port or universal serial bus (USB) port.

In some implementations, the storage module 160 may deliver an overflow signal 145 through the output port 122 of the module 160 to input port 118 of the trace module 150. The overflow signal 145 may be used by the storage module 160 to indicate to the trace module 150 that the storage module 160 succeeded/failed to execute a latest save command of the trace module 150 and a trace record associated with the latest save command was/was not saved. As an example, a voltage value may be used for the overflow signal 145 wherein a high voltage value may indicate a success and a low voltage value may indicate a failure, or vice versa.

In some implementations, the controller 100 can be implemented as an integrated circuit on a microcontroller chip and the system timestamps may be generated with reference to a system clock on the chip. In some implementations, the trace records 140 generated at the output 128 of the storage module 160 may be combined with instruction trace records of one or more software programs (e.g., generated by a program debugger), all trace records sharing the same timestamp and producing combined trace records of the program instructions and transfer requests.

In some implementations, the trace records 140 generated at the output 128 of the storage module 160 may be combined with event trace records capturing the signaling events of the controller 100 and instruction trace records of the software program, all three traces having the same timestamp and producing combined trace records of the program instructions, signaling events, and transfer requests. In some implementations, the system clock that is associated with the timestamps is a precise clock.

In some implementations, the trace records 140 or the combined trace records described above may additionally be combined with other records based on respective timestamps, the respective timestamps may be correlated with the timestamps of the trace records 140. As an example, the trace records described above may be combined with the time stamped power measurements, time stamped data transfers.

Figure 2:
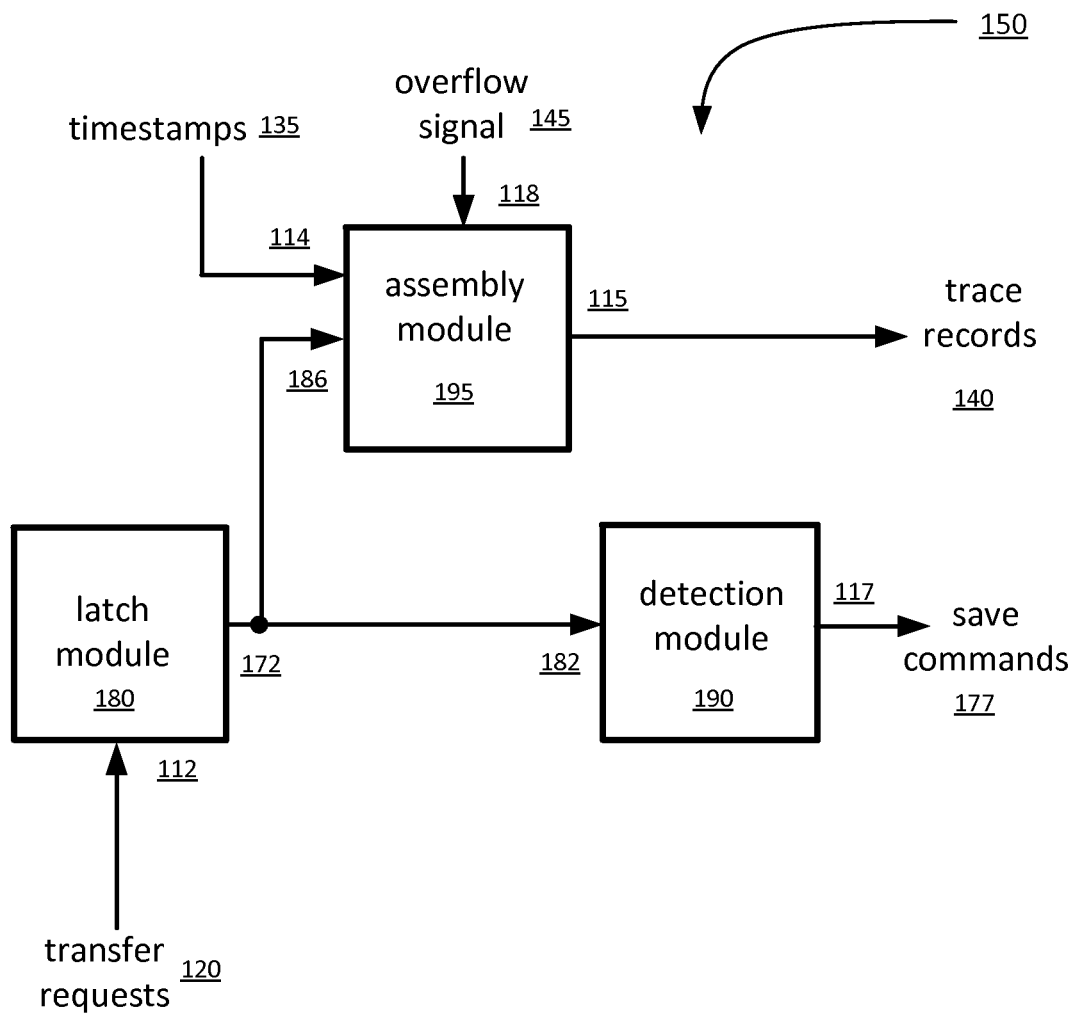
FIG. 2 is a diagram of an example trace module.

FIG. 2 illustrates an example of a trace module 150. The trace module 150 includes a latch module 180. The latch module 180 receives the transfer requests 120 through the input port 112. The latch module 180 can be configured to sample and hold the transfer requests. The sampled transfer requests can be passed through the output port 172 to a detection module 190. In some implementations, transfer requests may be sampled synchronously. In some implementations, edge detectors may be used for asynchronous sampling of the transfer requests.

The detection module 190 receives the sampled transfer requests through the input port 182. When transfer requests are detected by the detection module 190, save commands 177 can be generated and provided on the output port 117. In some implementations, the detection module 190 can generate a save command in response to each one of the transfer requests.

In some implementations, the detection module 190 may not be used, the input port 182 may directly couple to output port 177 and the sampled transfer requests of the input port 182 may be used as save commands.

In some implementations, a transfer request includes a write request to a DMA channel and/or a read request from a DMA channel and the transfer requests may be initiated by, for example, software, or peripheral devices. Examples of peripheral devices initiating transfer requests include analog to digital converters, wireless ports, optical ports, timers, coprocessors, secondary CPU cores, and touch screens. In some implementations, a transfer request is initiated for the read/write of every single byte.

In some implementations, the detection module 190 may receive mask data indicating the transfer requests that may be masked. The masked transfer requests are the requests that are not traced/monitored and in some implementations, can be discarded. In some implementations, only the transfer requests that are not masked may generate the save commands. In some implementations, all transfer requests except for the transfer requests of a single memory module may be masked. In some implementations, all transfer requests except for the transfer requests associated with a single DMA channel may be masked. In some implementations, no transfer request may be masked.

The assembly module 195 receives the sampled transfer requests through the input port 186 and the timestamps 135 through the input port 114. The assembly module 195 may generate a trace record associated with an unmasked request and incorporate a timestamp into the trace record. The generated trace records are provided at the output port 115 of the assembly module 195. In some implementations, the assembly module 195 may receive an overflow signal 145 through the input port 118 and may incorporate the overflow signal 145 into the trace records. In some implementations, the assembly module 195 may include a memory buffer for combining a timestamp and the overflow signal and creating a trace record. As an example, the memory buffer may include one or more bits designated for a timestamp, and at least one bit for incorporating the overflow signal 145.

As described with respect to FIG. 1, the respective output ports 115 and 117 of the assembly module 195 and the detection module 190 may be coupled to the storage module 160 so as to enable saving the trace records. The storage module 160 may provide the overflow signal 145 to indicate to the assembly module 195 that the storage module 160 failed or succeeded to execute the save command.

In some implementations, each trace record includes a single overflow bit and each saved trace record may indicate if a preceding trace record failed/succeeded to be saved. As an example, by checking the overflow bit of the trace records, a user of the trace records can find if any gap exists in the trace record of the transfer requests. In some implementations, the trace records may include between one and ten (e.g., 5) overflow bits. In some implementations, the overflow bits may indicate the number of consecutive failures or successes.

In some implementations, any two or more modules including the latch module 180, the detection module 190, and the assembly module 195 can be joined into a single command module that performs the functions of the combination.

Figure 3:
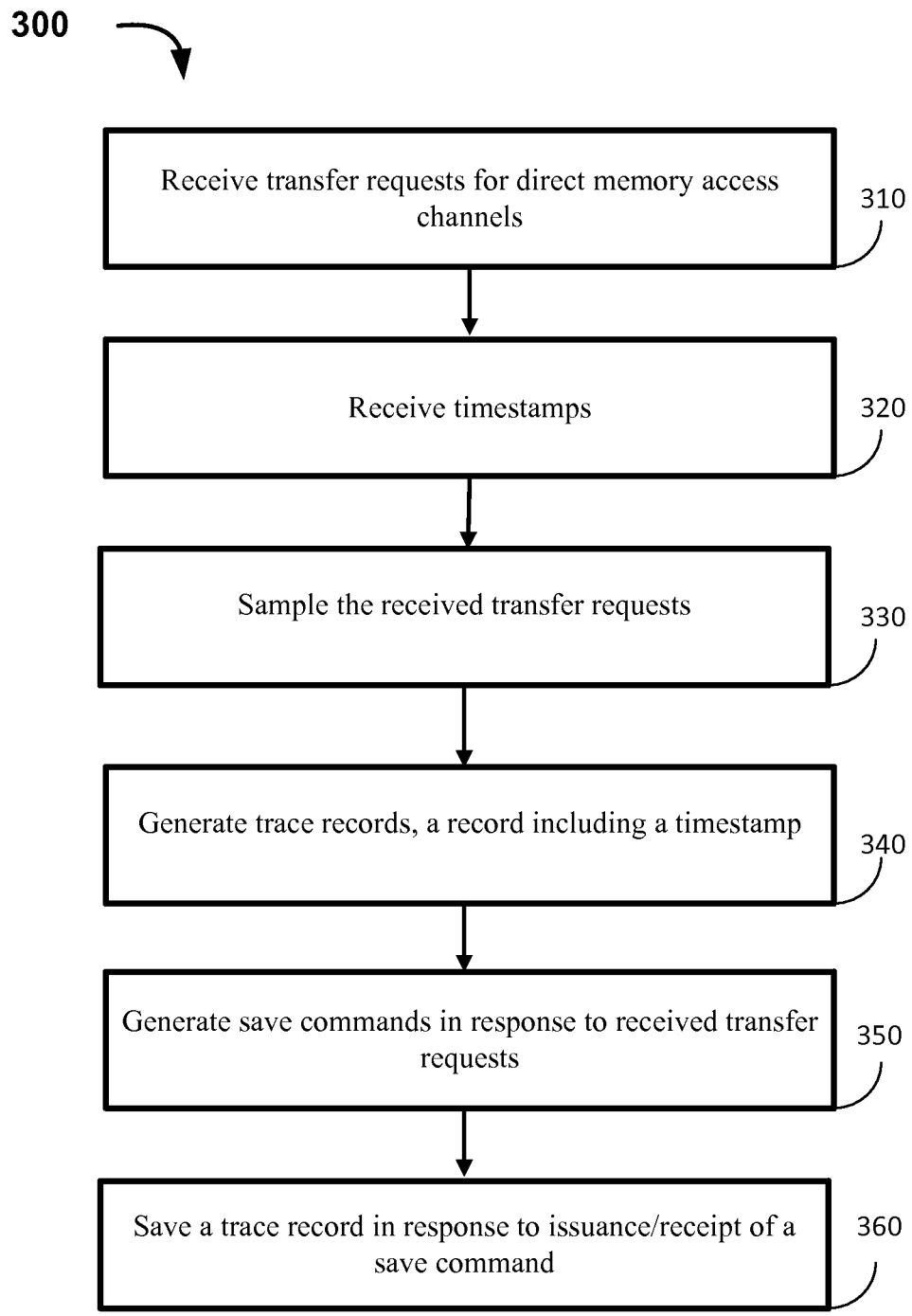
FIG. 3 is a flow diagram of an example method for saving trace records.

Referring to FIG. 3 a flow diagram of a method 300 is shown. As an example, the method 300 can be performed by the system 100 of FIG. 1. The method includes receiving transfer requests for direct memory access channels (310). The transfer requests can be initiated by software running on one or more CPUs, a peripheral device, or in response to an event. The transfer requests can be received by an example trace module 150 shown in FIG. 1. The transfer requests can be generated in parallel and therefore may simultaneously be available.

The timestamps are received, for example, by the trace module (320). In some implementations, system timestamps are internally generated and reference a system clock. The system timestamps may be made available to every module of the system 100.

The received transfer requests are sampled (330). As an example, the sampling of the transfer requests is performed by a latch module 180. The routing of the transfer requests may not be affected by the sampling. The transfer requests may last a few clock cycles and the sampling time period can be set to ensure transfer requests are not lost.

In some implementations, the transfer requests may last a very short period of time and synchronous sampling may not be performed. In some implementations, the latch module may use edge detectors for asynchronous detection and latching of the transfer requests.

Trace records are generated wherein each trace record includes a timestamp (340). As an example, trace records are generated by the assembly module 195 and each trace record includes a timestamp indicating a corresponding time of the sampling. In some implementations, the assembly module 195 may incorporate one or more overflow bit(s) in each trace record. In some implementations, trace records may indicate the DMA channel number and/or the target memory module associated with a given request. Setting or clearing the overflow bit(s) of trace records is described with respect to FIG. 4.

Save commands are generated in response to received transfer requests (350). As an example, the detection of the transfer requests may occur in the detection module 190 wherein upon detecting a transfer request, a save command can be generated and the save command may cause an example storage module 160 to save a trace record.

In response to issuance/receipt of a save command, a trace record is saved (360). As an example, a storage module 160 external to the trace module 150 receives the save commands and the trace records through the ports 126 and 124, respectively. When a save command is received by an example storage module 160, in response, the storage module 160 saves the corresponding content of the trace record that is delivered at the input port 124 of the storage module 160. In some implementations, the storage module 160 is used as a buffer and the trace records 140 are delivered to a memory module external to the storage module 160. In some implementations, one or more trace records are saved in the storage module 160.

In some implementations, trace records of different DMA channels may be separated by using separate buffers for saving trace records of different DMA channels. In some implementations, the DMA channel number may be included in a trace record and may indicate the DMA channel to which the trace record belongs.

In some implementations, the system timestamps can be shared with a debugger module configured for generating instruction trace records of the software programs running on one or more CPUs. The system timestamps may also be shared with an event tracing system configured for generating event trace records of the signaling events. Combining the trace records 140 with event trace records and instruction trace records that share the same timestamps and create a combined trace record of the program instructions, signaling events, and transfer requests.

In some implementations, the above described trace records may be combined with other records based on respective timestamps that may be synchronized in post processing.

Figure 4:
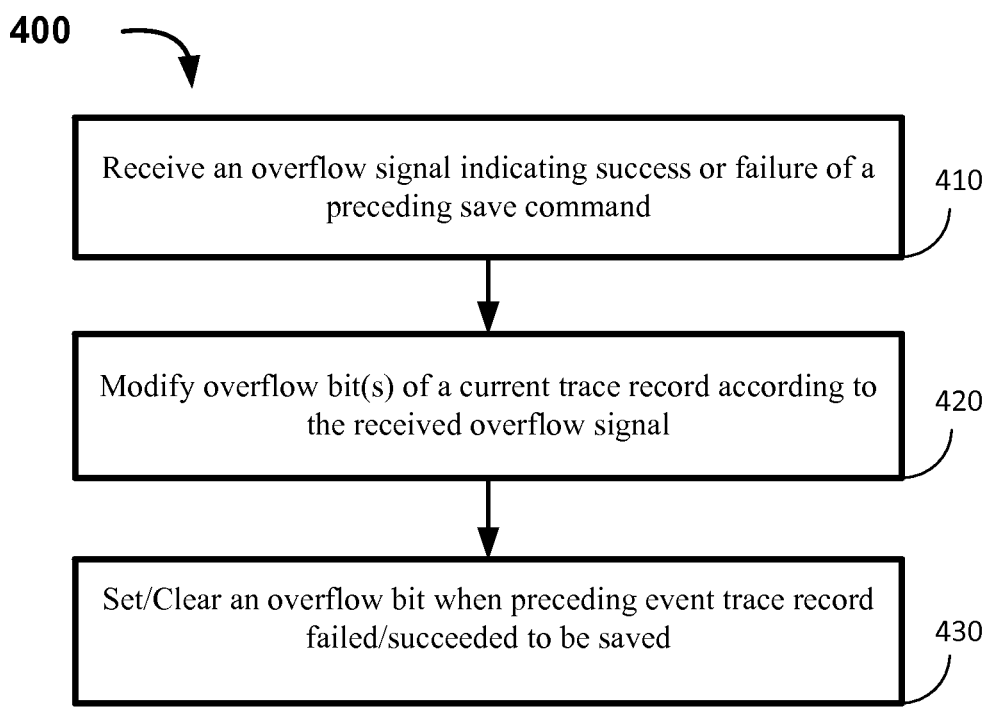
FIG. 4 is a flow diagram of an example method for setting/clearing an overflow bit.

Referring to FIG. 4, the flow diagram of a method 400 is shown. As an example, the method 400 can be performed by the assembly module 195 of FIG. 2 and can be used to set or clear the overflow bit(s) of trace records. An overflow signal indicating success or failure of a preceding save command is received (410). As an example the overflow signal 145 is received on the input port 118 of the assembly module 195. In some implementations the overflow signal 145 is received from an example storage module 160 that is configured to buffer or save the trace records.

The overflow bit(s) of a current trace record is modified according to the received overflow signal (420). In some implementations, each trace record may include one overflow bit and the overflow bit is modified according the received overflow signal.

An overflow bit is set/cleared when the preceding trace record failed/succeeded to be saved (430). As an example, the assembly module 195 sets or clears the overflow bit of a current trace record. In some implementation the overflow bit can be set when the preceding trace record failed to be saved and is cleared (reset) when the preceding trace record succeeded to be saved, or vice versa.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
    a direct memory access (DMA) controller configured to detect DMA transfer requests generated by peripherals and to generate one or more signaling events in response to the detected DMA transfer requests;
    a trace circuit configured to:
        receive the DMA transfer requests from the peripherals;
        compare each transfer request with mask data to determine unmasked transfer requests;
        generate a trace record for each unmasked transfer request;

obtain trace records for the one or more signaling events;

obtain instruction trace records generated by a software program debugger;

generating combined trace records that include trace records for the unmasked transfer requests, instruction trace records and trace records for the one or more signaling events;

generate one or more save commands for the combined trace records; and a storage circuit configured to save the combined trace records in response to the save command.

2. The system of claim 1, wherein the trace circuit further comprises:

a detection circuit that detects the transfer requests and generates the one or more save commands responsive thereto to enable saving of the trace records.

3. The system of claim 1, wherein overflow bits of the trace records upon unsuccessful storage of preceding trace records or upon successful storage of the preceding trace records, respectively.

4. The system of claim 1, wherein the system initiates the transfer requests.

5. The system of claim 1, wherein the transfer requests are received in parallel.

6. The system of claim 1, wherein the system is a part of an integrated circuit incorporated in a chip.

7. The system of claim 1, wherein the transfer requests further comprise at least one of:

a read request from a direct memory access channel; and a write request to the direct memory access channel.

8. The system of claim 7, wherein the transfer requests are generated for each unit of data transferred from or to the direct memory access channel.

9. The system of claim 1, wherein the storage circuit is coupled to one or more devices for saving or viewing the trace records, and the one or more devices include:

a dedicated timestamp trace buffer, a dedicated physical trace port, an existing trace port, wherein the port is configured to be shared, or an onboard direct access memory channel coupled to an onboard static random access memory.

10. A method comprising:

receiving, by a trace circuit, direct memory access (DMA) transfer requests generated by peripherals;

comparing, by the trace circuit, each transfer request with mask data to determine unmasked transfer requests;

generating, by the trace circuit, a trace record for each unmasked transfer request;

obtaining, by the trace circuit, trace records for one or more signaling events generated by a DMA controller in response to the DMA transfer requests;

obtaining, by the trace circuit, instruction trace records generated by a software program debugger;

generating, by the trace circuit, combined trace records that include trace records for the unmasked transfer requests, instruction trace records and trace records for the one or more signaling events;

generating, by the trace circuit, one or more save commands for the combined trace records; and saving, by a storage circuit, the combined trace records in response to the one or more save commands.

11. The method of claim 10, further comprising:

modifying overflow bits of the trace records according to signals, including setting the overflow bits when preceding trace records fail to be saved.

12. The method of claim 11, the method further comprising:

clearing the overflow bits of the trace records when the preceding trace records are successfully saved.

13. The method of claim 10, further comprising:

detecting, by a detection circuit, the transfer requests; and responsive to the detecting, generating the one or more save commands to save the combined trace records.

14. The method of claim 10, wherein the transfer requests are received in parallel.

15. The method of claim 10, wherein the transfer requests further comprise at least one of:

requesting a read access from a direct memory access channel; and requesting a write access to the direct memory access channel.

16. The method of claim 15, further comprising:

generating the transfer requests for units of data transfer to or from the direct memory access channel.

* * * * *